United States Patent [19]

Ichimura

[11] Patent Number: 4,977,461
[45] Date of Patent: Dec. 11, 1990

[54] DROPOUT DETECTING CIRCUIT WITH ONE-HALF WAVELENGTH DELAY

[75] Inventor: Isao Ichimura, Tokyo, Japan

[73] Assignee: Sony Corporation, Tokyo, Japan

[21] Appl. No.: 323,894

[22] Filed: Mar. 15, 1989

[30] Foreign Application Priority Data

Mar. 18, 1988 [JP] Japan .................................. 63-65334

[51] Int. Cl.⁵ ............................................... H04N 5/94
[52] U.S. Cl. .................................... 358/336; 358/314;
360/38.1; 369/60
[58] Field of Search .................... 369/107, 124, 59, 60;
358/314, 336, 340, 166, 167, 177, 329, 36, 37;
360/38.1

[56] References Cited

U.S. PATENT DOCUMENTS

| | | | |
|---|---|---|---|
| 3,925,811 | 12/1975 | Kenney | 358/314 |
| 4,091,425 | 5/1978 | Dakin | 358/336 |
| 4,122,489 | 10/1978 | Bolger et al. | 358/314 |
| 4,376,289 | 3/1983 | Reitmeier et al. | 358/314 |
| 4,409,627 | 10/1983 | Eto et al. | 360/38.1 |
| 4,731,675 | 3/1988 | Tachibawa | 358/336 |
| 4,755,887 | 7/1988 | Deaver et al. | 360/5 |
| 4,792,953 | 12/1988 | Pasdera et al. | 358/314 |
| 4,851,934 | 7/1989 | Takeuchi et al. | 360/38.1 |

Primary Examiner—Aristotelis M. Psitos
Assistant Examiner—Huy Nguyen
Attorney, Agent, or Firm—Lewis H. Eslinger; Jay H. Maioli

[57] ABSTRACT

A dropout detection circuit includes a delay circuit for causing a delay in playback signals reproduced from an optical recording medium. The delay corresponds to one half of the wavelength of the central frequency of the carrier wave for the playback signals. A summation circuit sums the playback signals with the delayed output signals of the delay circuit, and a level detection circuit detects when the output signal level of the summation circuit exceeds a predetermined level. The output signal of the level detection circuit serves as a signal for detecting dropouts in the reproduced signals and is used as a control signal to control the operation of a switch. The switch normally passes demodulated playback signals to an output terminal. However, in case a dropout is detected in a given horizontal line, the control signal operates the switch so that it passes to the output terminal demodulated playback signals that have been delayed by one horizontal line period.

6 Claims, 4 Drawing Sheets

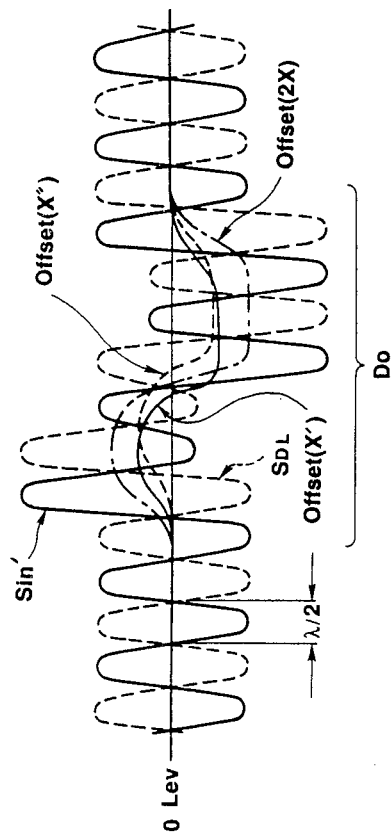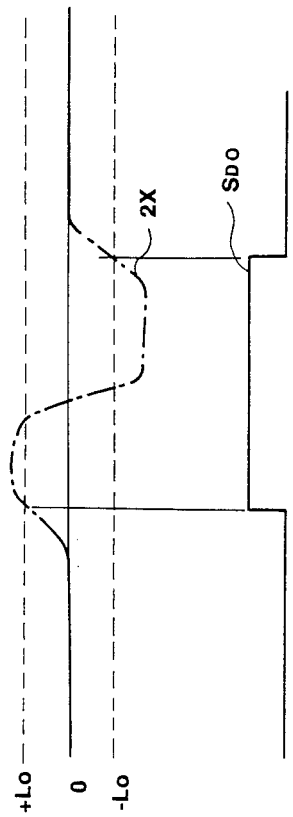
FIG. 2A
FIG. 2B
FIG. 2C

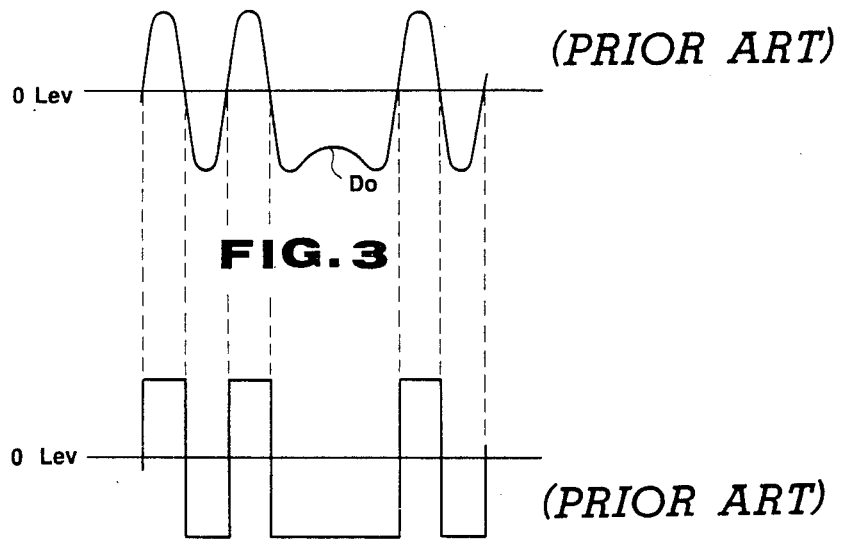
FIG. 3 (PRIOR ART)
FIG. 4 (PRIOR ART)
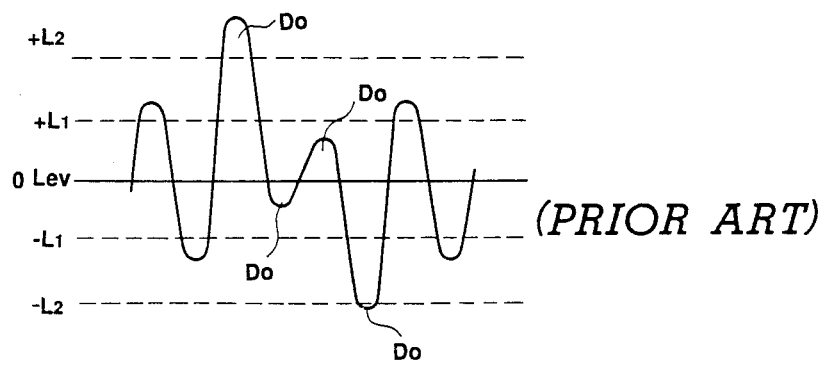
FIG. 5 (PRIOR ART)

DROPOUT DETECTING CIRCUIT WITH ONE-HALF WAVELENGTH DELAY

BACKGROUND OF THE INVENTION

1. Field of the Invention

This invention relates to a dropout detecting circuit for detecting the dropout in playback signals reproduced from an optical recording medium, and may be applied to, for example, an optical disk player employing so-called read only optical disks, write once disks or erasable optical disks.

2. Description of the Prior Art

In general, in a reproducing system for a video tape recorder or a laser disk player, for example, a signal dropout in the radio frequency (RF) playback or reproduced signals gives rise to excessive noise in the demodulated output and consequently to a deterioration of the quality of the image formed on the basis of the reproduced signals. For this reason, signal dropout detection in the RF playback or reproduced signals is carried out and steps are taken to compensate for the defective portion of the reproduced signals.

As a dropout detection circuit for sensing or detecting dropout of RF playback or reproduced signals, there is known a system operating on the principle of so-called zero-crossing. In such a system, the zero level (0 Lev) of the RF playback signals shown in FIG. 3 is detected, a pulse waveform having a corresponding period as shown in FIG. 4 is formed, and the dropout Do is detected from changes in the period. However, in this type of zero crossing, only larger dropouts causing complete elimination of RF playback signals can be detected.

Thus, in a more customary dropout detection circuit, portions Do of the RF signals exceeding a predetermined uppermost limit level $+L_2$ or exceeding (in a negative direction) a predetermined lowermost limit level $-L_2$, as shown in FIG. 5, are identified as representing signal dropouts. In other words, portions of the RF signals lying outside the range defined by $+L_2$ and $-L_2$ are identified as representing signal dropouts. Moreover, portions of the signal level of the RF signals not reaching an upper limit level $+L_1$ or a lower limit $-L_1$, as shown in FIG. 5, are also identified as representing dropouts.

In another conventional dropout detection circuit, portions Do of the playback RF signals exhibiting characteristic changes in the envelope thereof, as shown in FIG. 6, are identified as representing signal dropouts.

There has also been employed a circuit in which RF playback signals are demodulated into video signals, as shown in FIG. 7, and video signals Do appearing outside the video area defined by the broken lines are identified as representing signal dropouts.

In the RF playback signals from an optical recording medium, such as an optical disk, the frequency modulated playback video signals are superimposed on a predetermined offset DC voltage before being reproduced. When the RF playback signals are demodulated into video signals, the offset level is set to zero level (0 Lev). Thus the changes in the offset level caused by the material and the method of preparation of the disk or caused at the time of recording or playback contribute to the occurrence of dropouts that interfere with satisfactory signal reproduction.

However, in the conventional dropout detection circuits, signal dropout caused by fluctuations in the offset level can be detected only with difficulty. When an attempt is made to elevate the detection sensitivity in order to detect dropouts caused by fluctuations in the offset level, normal signals are likely to be erroneously identified as dropouts.

OBJECTS AND SUMMARY OF THE INVENTION

An object of the present invention is to remedy the problems of the prior art noted above and, in particular, to provide a novel dropout detection circuit wherein dropouts caused by the fluctuations in the DC offset may be detected with high sensitivity.

Another object of the invention is to provide a dropout detection circuit the operation of which does not interfere with the proper detection of normal signals.

The foregoing and other objects are attained in accordance with the invention by the provision of a circuit for detecting dropout from playback signals reproduced from an optical recording medium, the playback signals having a carrier wave with a center frequency corresponding to a given wavelength and the circuit comprising: a delay circuit for effecting in the playback signals a delay corresponding to one half of the wavelength and thereby producing delayed output signals; a summation circuit for summing the playback signals and the delayed output signals and thereby producing a sum signal; and a level detection circuit for detecting when the sum signal has a level that exceeds a predetermined level and thereby producing a detection output signal; the detection output signal being indicative of a dropout in the playback signals.

In accordance with another aspect of the invention, there is provided an optical device for reproducing video signals from an optical disk on which the video signals are optically recorded in successive horizontal scanning periods with frequency modulation of a carrier signal having a center frequency corresponding to a given wavelength, the device comprising: pickup means for picking up the frequency modulated video signals from the optical disk and producing playback signals; demodulation means for frequency demodulating the frequency modulated video signals picked up by the pickup means; horizontal scanning period delay means for delaying the frequency demodulated video signals by one horizontal scanning period of the video signals; an output terminal; switching means connected to the demodulation means, the horizontal scanning period delay means, and the output terminal; a delay circuit for effecting in the playback signals a delay corresponding to one half of the wavelength and thereby producing delayed output signals; a summation circuit for summing the playback signals and the delayed output signals and thereby producing a sum signal; and a level detection circuit for detecting when the sum signal has a level that exceeds a predetermined level and thereby producing a detection output signal; the detection output signal being supplied to the switching means as a control signal for selectively connecting the demodulation means or the horizontal scanning period delay means to the output terminal.

In accordance with the present invention, the playback signals reproduced from an optical recording medium are summed with the playback signals to which a delay corresponding to one half of the wavelength of the central frequency of the carrier waves for the playback signals is imparted to produce signals having a signal level which is twice the signal level of the fluctuations of an offset that represent signal dropout. Dropout detection signals are formed from this doubled signal level. By thus forming the dropout detection signal from this doubled signal level, normal signals are unlikely to be erroneously detected as dropouts, even though the detection sensitivity is elevated. Thus dropouts caused by fluctuations in the offset of the playback signal level can be detected with higher sensitivity.

BRIEF DESCRIPTION OF THE DRAWINGS

A better understanding of the objects, features and advantages of the invention may be gained from a consideration of the following detailed description of the preferred embodiment thereof, in conjunction with the appended figures of the drawings, wherein:

FIGS. 2A, 2B and 2C are diagrams showing the waveforms of signals generated by various components of the circuit of FIG. 1;

FIG. 3 is a diagram showing the waveform of an RF playback signal produced by a conventional dropout detection circuit and illustrating the detection of zero-crossing;

FIG. 4 is a diagram showing the waveform of a pulse signal formed from the RF playback signal of FIG. 3;

FIG. 5 is a diagram showing the waveform of an RF playback signal and illustrating conventional detection of signal level fluctuations;

DESCRIPTION OF PREFERRED EMBODIMENT

FIGS. 1 and 2A, 2B and 2C illustrate a preferred embodiment of a dropout detection circuit constructed in accordance with the present invention.

Figure 1:
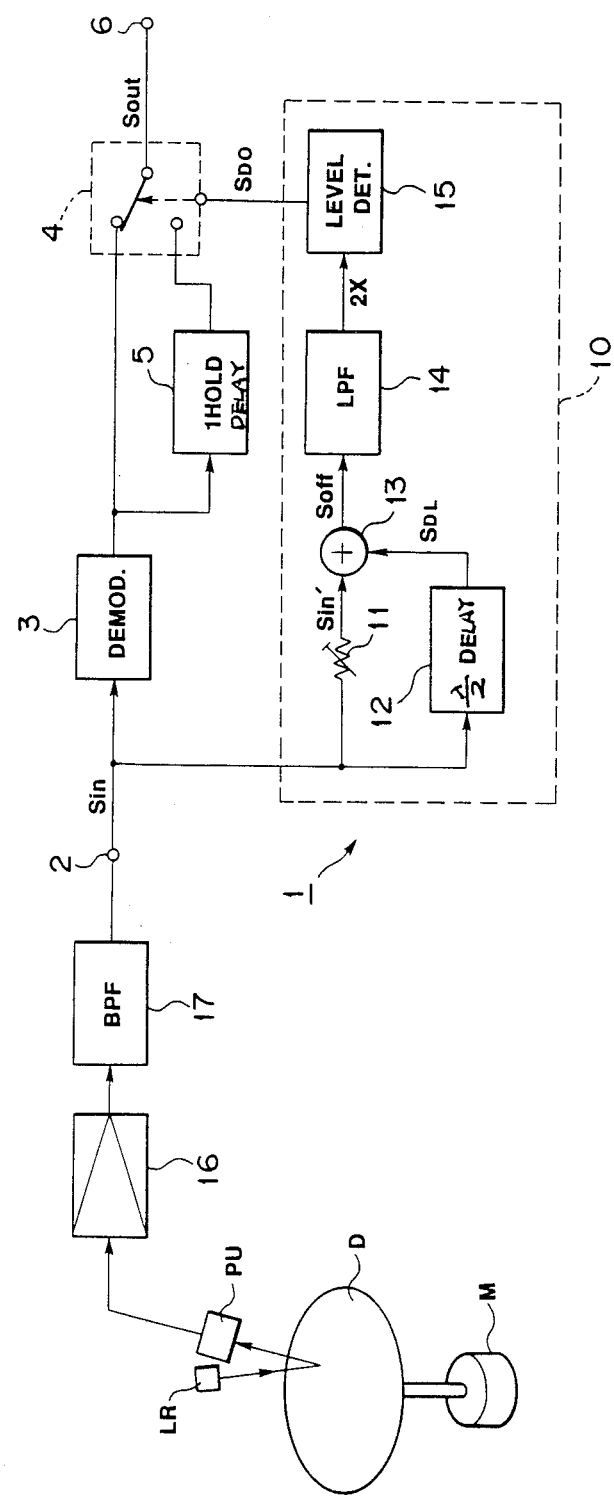
FIG. 1 is a block diagram showing a preferred embodiment of a dropout detection circuit constructed in accordance with the present invention.
Figure 6:
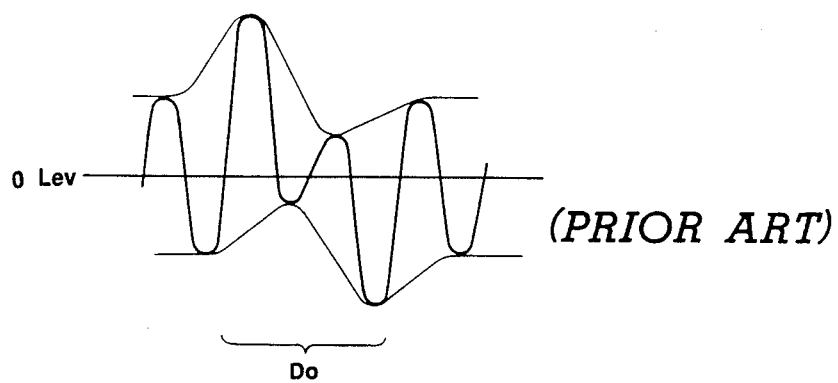
FIG. 6 is a diagram showing the waveform of an RF playback signal and illustrating conventional envelope detection.
Figure 7:
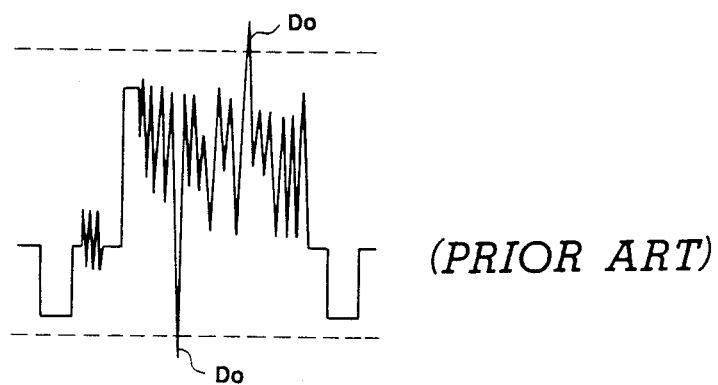
FIG. 7 is a diagram showing the waveform of a video signal and illustrating the conventional detection of abnormal amplitudes therein.

In the block diagram of FIG. 1, the present invention is shown as applied to a dropout compensation device 1 employed in a reproducing system of an optical disk player. In the dropout compensation device of FIG. 1, RF playback or reproduced signals read from an optical disk D by an optical pickup PU are supplied as input signals $S_{in}$ to a signal input terminal 2 via a preamplifier 16 and a bandpass filter (BPF) 17 adapted to pass only video signals. A laser light source LR illuminates a selected portion of the disk D (which can be moved radially relative to the disk D), and an electric motor M rotates the disk D about its axis so that the selected portion scans the disk D in a known manner. The input signals $S_{in}$ are supplied to both a demodulating circuit 3 and a dropout detection unit 10.

The demodulating circuit 3 is adapted to demodulate the input signals $S_{in}$ into video signals and to supply the demodulated signals to one input of a changeover circuit or switch 4 and to a 1H delay circuit 5. This 1H delay circuit 5 is adapted to delay video signals supplied from the demodulating circuit 3 by one horizontal period (1H) and to supply the delayed signals to the other input of the switching circuit 4. The switching circuit 4 is adapted to selectively connect the aforementioned inputs to a signal output terminal 6, so that either the video signals supplied by the demodulating circuit 3 or the video signals supplied by the 1H delay circuit 5 with a 1H delay are supplied as output signals $S_{out}$ to the signal output terminal 6.

The dropout detection unit 10 is made up of a variable resistor 11, a delay circuit 12, a summation circuit 13, a low pass filter (LPF) 14, and a level detection circuit 15. The two inputs of the summation circuit 13 are connected to the aforementioned signal input terminal 2 via the variable resistor 11 and the delay circuit 12, respectively. The output of the summation circuit 13 is connected to the level detection circuit 15 via the LPF 14. The output of the level detection circuit 15 is connected to a control input of the switching circuit 4. The variable resistor 11 may be omitted, and an amplifier as well as a variable resistor may be provided at the output of the delay circuit 12 in order to effect level matching with the playback signal $S_{in}$.

In the above described dropout detection unit 10, the delay circuit 12 is adapted to form a delayed signal $S_{DL}$ which represents the input signal $S_{in}$ from the signal input terminal 2 to which is imparted a delay corresponding to one half the wavelength λ of the center frequency of the carrier wave (λ/2). Thus, as shown in broken outline in FIG. 2A, the delay circuit 12 forms the delay signal $S_{DL}$ which is oppositely phased (i.e., 180° out of phase) with respect to the input signal $S_{in}'$ supplied via the variable resistor 11 to the summation circuit 13. The input signal $S_{in}'$ and the delayed signal $S_{DL}$ are summed in the summation circuit 13, and the resulting summation signal $S_{off}$ is supplied to the LPF 14. The input signal $S_{in}'$ supplied to the summation circuit 13 is set to a predetermined signal level by the variable resistor 11 so that the signal level of an offset indicating the zero level of the signal $S_{in}'$ coincides with the level of the delay signal $S_{DL}$ supplied as an output from the delay circuit 12.

Fluctuations D of the signal level representing dropouts of the input signal $S_{in}'$ may be thought of as arising from fluctuations of an offset superimposed on video signals which have been frequency modulated by predetermined carrier waves. Hence, with the fluctuations x of the offset, the summation signal $S_{off}$ of the summation circuit 13 may be expressed by:

$$\begin{aligned} S_{off} &= S_{in}' + S_{DL} \\ &= A\cos 2\pi ft + x' + \\ &\quad A\cos(2\pi ft + \Delta) + x'' \\ &= A(1 + \cos\Delta)\cos 2\pi ft - \\ &\quad A\sin\Delta\sin 2\pi ft + (x' + x'') \\ &\approx 2x \end{aligned}$$

In the formula set out above, f and Δ indicate respectively the frequency and the amount of delay of the original signal $S_{in}$, A is the amplitude of the original signal $S_{in}$, t is time, x' is a fluctuation component of the original signal $S_{in}$, x'' is a fluctuation component of the delayed signal $S_{DL}$, x is alternated fluctuation components for the individual fluctuation components x' and x'', and x'≈x''.

In this manner, the input signal $S_{in}'$ is summed by the summation circuit 13 with the oppositely phased, delayed signal $S_{DL}$ to produce a summation signal $S_{off}$, which is filtered to produce a signal 2x having a signal level substantially twice that of the fluctuations x' or x'' of the offset described above. In other words, the summation signal $S_{off}$ consists of fluctuations of the offset and has a signal level substantially twice that of the input signal $S_{in}'$. This summation signal $S_{off}$ is supplied to the LPF 14, where it is freed of high frequency components caused by the frequency fluctuations of the frequency modulated input signals $S_{in}$. The resulting offset voltage 2x is supplied to the level detection circuit 15.

The level detection circuit 15 is formed by a comparator comparing the signal level of the offset signal 2x supplied via the LPF 14 to a predetermined upper limit level +Lo and a predetermined lower limit level −Lo. The output of the comparator is transmitted as a dropout detection signal $S_{Do}$ to the switching circuit 4 to control the switching thereof in the following manner. As FIG. 2B shows, when the signal level of the summation signal $S_{off}$ is intermediate between the upper and lower limit levels +Lo and −Lo, the level detection circuit 15 understands that there has been no dropout in the input signal $S_{in}$ and connects the demodulating circuit 3 to the signal output terminal 6. When the signal level of the summation signal $S_{off}$ is larger than the upper limit level +Lo or less than the lower limit level −Lo, i.e., when it lies outside the range defined by −Lo and +Lo, the level sensor circuit 15 understands that a dropout has occurred in the input signal $S_{in}$ and transmits an output signal $S_{Do}$ as shown in FIG. 2C to connect the 1H delay circuit 5 to the signal output terminal 6. Thus, when a dropout has occurred in the input signal $S_{in}$, a video signal that occurred 1H before, that is, a video signal that in probabilistic terms is vertically correlated with the signal in which the dropout occurred, is supplied as the output signal $S_{out}$. As explained above, the level detector 15 supplies as an output the signal $S_{Do}$ as shown in FIG. 2C when the signal 2x as shown in FIG. 2B is supplied thereto.

Thus only on the occasions when the level of the input signal 2x is larger than the upper limit level +Lo or less than the lower limit level −Lo, the output $S_{Do}$ generated by the circuit 15.

Note that the signal 2x shown in FIG. 2B does not exceed either limit level +Lo or −Lo around the zero cross point. Accordingly, the output $S_{Do}$ cannot be generated around the zero cross point in response to a dropout occurring in this short period unless a hysteresis function is provided.

In accordance with the present invention, a hysteresis function is provided in the circuit 15, so that the zero cross point is neglected and the succeeding high level output $S_{Do}$ is obtained without any interruption thereof.

In this manner, only the fluctuations of the offset of the input signal $S_{in}'$ are supplied to the level detection circuit 15 at twice the signal level. Therefore, in the apparatus of FIG. 1, even when the level difference between the upper limit level +Lo and the lower limit level −Lo of the level detection circuit 15 is elevated, there is little risk that a normal signal will be mistakenly identified as a dropout. Thus, by setting the upper and lower limit levels +Lo and −Lo to optimum values, dropouts of playback signals over a wide range can be detected.

The components of the input signal $S_{in}$ other than the fluctuations of the offset can be eliminated by summing the delay signal $S_{DL}$ with the input signal $S_{in}'$ which delay signal is the input signal $S_{in}$ delayed by half the wavelength of the central frequency of the carrier wave ($\lambda/2$). Although the dropout has both positive and negative DC offsets, as shown in FIG. 2A, this is not limiting, and signal dropouts of playback signals having only the positive or only negative offsets can naturally be detected and compensated within the scope of the present invention. Therefore it is possible with an optical disk player according to the present invention to detect signal dropouts whenever the amplitude of the reproduced RF signals changes as a function of the reading position from the center. Thus, by compensating the dropout, images can be reproduced satisfactorily.

Although the present invention is applied in the embodiment described above to the reproducing system of an optical disk player, the present invention is not limited to that application. For example, the present invention may be applied to a dropout detection circuit adapted to detect dropout of playback signals reproduced from an optical recording medium, such as an optical disk, on which the signals have been recorded previously by the same apparatus. That is, the present invention can be applied vary efficiently to a so-called write-once type of optical recording and reproducing disk device on which signals can be both recorded and reproduced and in which a DC offset is apt to be produced on account of the composition of the disk material or at the time of the recording.

Thus there is provided in accordance with the invention a novel and highly effective dropout detecting circuit that remedies the problems of the prior art noted above. In particular, a dropout detecting circuit constructed in accordance with the invention detects dropouts caused by DC offset with high sensitivity without interfering with the proper detection of normal signals. Many modifications of the preferred embodiment of the invention described herein will readily occur to those skilled in the art, and the scope of the invention is to be determined only by the appended claims.

What is claimed is:

1. A circuit for detecting dropout from playback signals reproduced from an optical recording medium, said playback signals having a carrier wave with a center frequency corresponding to a given wavelength and said circuit comprising:

a delay circuit for effecting in said playback signals a delay corresponding in time to one half of said given wavelength of said center frequency of said carrier and thereby producing delayed output signals;

a summation circuit for summing said playback signals and said delayed output signals and thereby producing a sum signal having amplitude substantially equal to two times an amplitude of said playback signal; and a level detection circuit for detecting when said sum signal has a level that exceeds predetermined offsets levels and thereby producing a detection output signal;

said detection output signal being indicative of a dropout in said playback signals.

2. A dropout detection circuit according to claim 1 further comprising control means for controlling the signal level of at least one of said playback signals and said delayed output signals.

3. A dropout detection circuit according to claim 2 wherein said control means includes a variable resistor for changing the signal level of said playback signals.

4. A dropout detection circuit according to claim 1 wherein a hysteresis effect for level discrimination is imparted to the level detection circuit.

5. An optical device for reproducing video signals from an optical disk on which said video signals are optically recorded in successive horizontal scanning periods with frequency modulation of a carrier signal having a center frequency corresponding to a given wavelength, said device comprising:

pickup means for picking up said frequency modulated video signals from said optical disk and producing playback signals;

demodulation means for frequency demodulating said playback signals formed of said frequency modulated video signals picked up by said pickup means;

horizontal scanning period delay means for delaying said frequency demodulated video signals by one horizontal scanning period of said video signals;

a dropout detecting circuit;

an output terminal;

switching means responsive to said dropout detecting circuit and connected to said demodulation means, said horizontal scanning period delay means, and said output terminal; and said dropout detecting circuit including a delay circuit for effecting in said playback signals produced by said pickup means a delay corresponding to one half of said wavelength of said center frequency of said carrier signal and thereby producing delayed output signal, a summation circuit for summing playback signals produced by said pickup means and said delayed output signals and thereby producing a sum signal having an amplitude twice that of said playback signals, and a level detection circuit for detecting when said sum signal has a level that exceeds predetermined offset levels and thereby producing a detection output signal said detection output signal being supplied to said switching means as a control signal for selectively connecting said demodulation means or said horizontal scanning period delay means to said output terminal.

6. An optical device according to claim 5 wherein said switching means normally connects said demodulation means to said output terminal and connects said horizontal scanning period delay means to said output terminal in response to a determination that said sum signal has a level that exceeds said predetermined level.

* * * * *